April 1, 1969     C W. MUSSER     3,435,705

HARMONIC DRIVE POWER HINGE PINS

Filed June 14, 1966     Sheet _1_ of 4

Inventor
C. Walton Musser
By his Attorney
Carl E. Johnson

United States Patent Office 3,435,705
Patented Apr. 1, 1969

3,435,705
HARMONIC DRIVE POWER HINGE PINS
C Walton Musser, Palos Verdes Estates, Calif., assignor to United Shoe Machinery Corporation, Flemington, N.J., a corporation of New Jersey
Filed June 14, 1966, Ser. No. 557,580
Int. Cl. F16h 33/00
U.S. Cl. 74—640                                                                                                                4 Claims

ABSTRACT OF THE DISCLOSURE

A rotary power transmission, especially of the harmonic drive reducer type, employs axially spaced, relatively rotating members respectively provided with journal bearings designed greatly to reduce the co-efficient of friction between their bearing surfaces. Either a circular spline may incur a progressing elliptoidal shape (of considerably lower magnitude of strain than in its cooperative flexspline) or, if the circular spline be non-deflecting, be radially displaceable during rotation to create two hydrodynamic wedges between the bearing members immediately ahead of localities along the major axis. Reduction in friction load is attributable to the sliding-rolling contact of the members, rolling velocity being considerably more than that of the sliding velocity.

---

This invention relates to rotary actuators of the harmonic drive type, and more particularly to improved, journal bearing means for angularly driving one element of a hinge like structure in pivotal relation to another. As herein illustrated the invention is particularly well adapted for use in units or in axially stacked sections respectively having alternately rotatable and relatively stationary elements. It will be appreciated, however, that the invention is not limited to the particular embodiments herein selected by way of exemplification but has application to a variety of rotary power actuators.

The advantages of harmonic drive transmissions for many purposes are generally recognized and especially include high torque capability for a given diameter. Such transmissions, as disclosed for example in United States Letters Patent No. 2,906,143 and No. 2,959,065, granted respectively on Sept. 29, 1959, and Nov. 8, 1960, in my name, feature the use of a circumferential wave of radial deflection and accordingly they are sometimes known as "strain wave gearing." Briefly, by way of background information, a mechanical harmonic drive includes in coaxial relation a circular spline, a tubular flexspline, and a wave generator cam, the latter having a circumferential wave shape (which may be elliptoid or include more than two spaced lobes) for effecting and generating points of spline engagement between the splined members one of which is normally fixed and the other of which serves as an output. For purposes of discussion only, the shape of the wave generator will hereinafter be referred to as elliptoid, and accordingly, it is assumed that there are two localities of spline engagement on the major or minor axes; it is to be noted, however, that other wave shapes employing more than two lobes may also be used when desired.

When an elliptoidal wave generator is employed, the number of splines on the harmonic drive toothed members differs by two or a multiple thereof as set forth in the mentioned Patent No. 2,906,143; when the special case of harmonic drive disclosed in the cited Patent No. 2,959,065 (referred to hereinafter as a "dynamic spline") is employed, the spline teeth formed on the meshing stationary circular member and on the radially deflectable, rotary member are equal in number. The dynamic spline arrangement has use in providing high precision angular adjustments and, as disclosed in the last mentioned patent, has advantage when combined with differentially splined harmonic drive, the latter then acting as a coupling for the dynamic spline.

It is a primary object of this invention to provide a power coupling or hinge comprising axial sections each of which operates about the common axis to hold the hinged parts together while exerting high torque by means of balanced forces to produce relative rotation, with reduced friction load, between the stationary and movable parts.

Another object of this invention is to provide in a compact rotary actuator a novel and improved combination of dynamic spline and differentially splined harmonic drive by means of which high torque capability is obtained and a sliding-rolling contact for reducing friction load between relatively rotating members is accomplished.

It is a further object of this invention to provide a standardized plug-in actuator cartridge having superior bearing hinge support and aligning characteristics.

To these ends a feature of the present invention contemplates a harmonic drive type hinge unit comprising, in coaxial arrangement, a tubular flexspline meshing with at least one series of three circular splines, either a central one of the three serving as output and having reaction in the other two anchoring circular splines which are stationary, or a central one of the three being stationary and providing reaction for the other two which serve as output members. Hence outboard circular splines of a three-element cartridge, according to the invention, are dynamic splines or differentially toothed harmonic drive splines, the intermediate circular spline being, respectively, a differentially toothed harmonic drive spline or a dynamic spline. Depending therefore on whether, as regards the three element cartridge, a dynamic circular spline is intermediate or outboard and serves as output or anchoring member, four different arrangements of the novel cartridge assembly are possible. In either of the alternate arrangements the odd number of circular splines (greater than one) produces balanced loads on the flexspline, while the greater number of alternate fixed and rotating elements provides a more uniform load distribution over the flexspline, circular spline, and wave generator bearings.

Another feature of the invention resides in the provision of novel combination sliding-rolling contact annular bearings radially interlocking the relatively moving circular splines. Rotation of the wave generator propagates a rotating strain wave in the circular splines and produces a circumferentially advancing rolling-sliding contact between the bearing interfaces markedly to reduce friction load.

In accordance with a further feature of the invention axial stacking of a series of three element hinge cartridges is contemplated for use with a single flexspline; or when more economical or otherwise desirable, in lieu of a long single flexspline, several flexsplines may be axially aligned for use while respectively spanning rotatable and fixed circular splines.

The foregoing and other features of the invention will now be more particularly described in connection with selected embodiments and with reference to the accompanying drawings thereof, in which.

Figure 1:
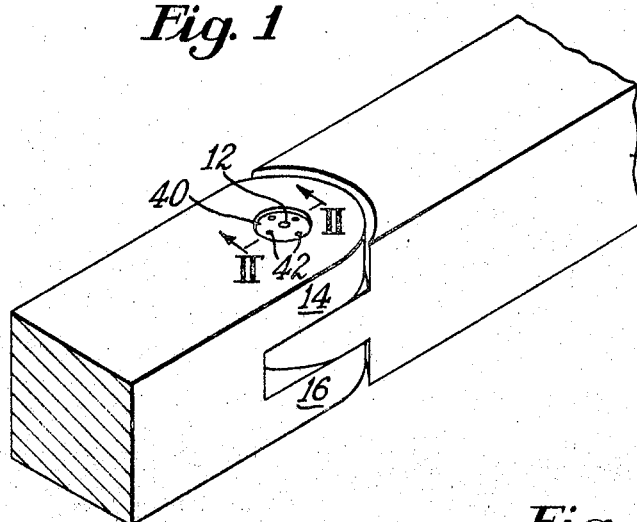
FIG. 1 is a perspective view of a harmonic drive power hinge pin including two fixed circular splines and an intermediate circular spline output.
Figure 2A:
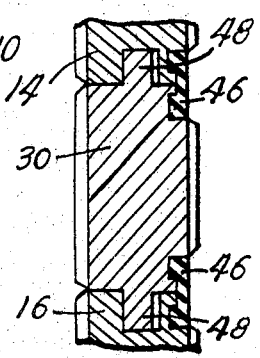
FIG. 2A is a section showing certain annular bearing portions seen in FIG. 2, but at localities 90° advanced, the clearances indicated in both views being greatly exaggerated and being external in FIG. 2A.
Figure 2:
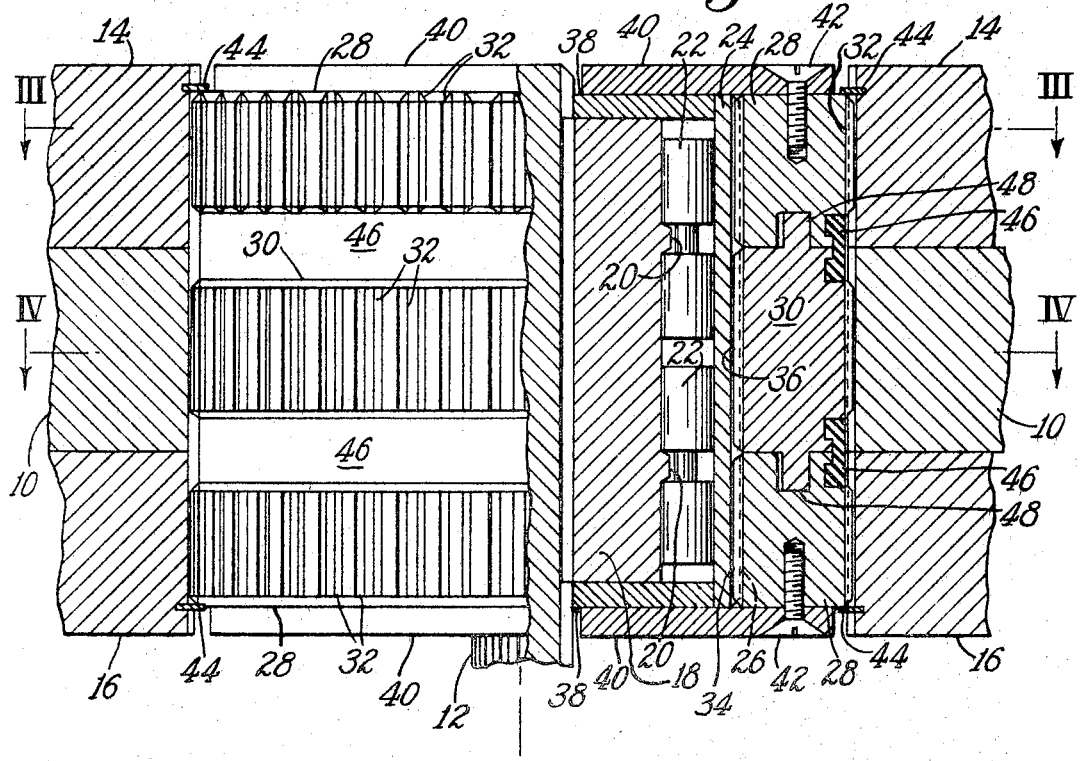
FIG. 2 is an enlarged axial section mainly taken on the plane indicated by the lines II—II in FIG. 1, an input shaft being partly broken away and schematically connected to a source of power.
Figure 3:
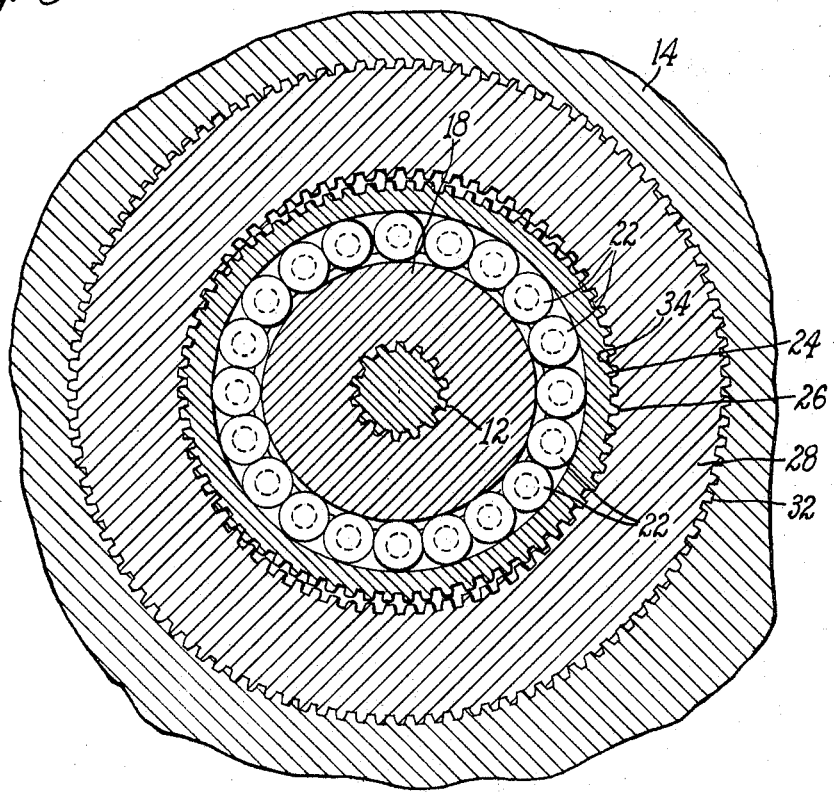
FIGS. 3 and 4 are transverse sections taken on the lines III—III and IV—IV in FIG. 2.
Figure 4:
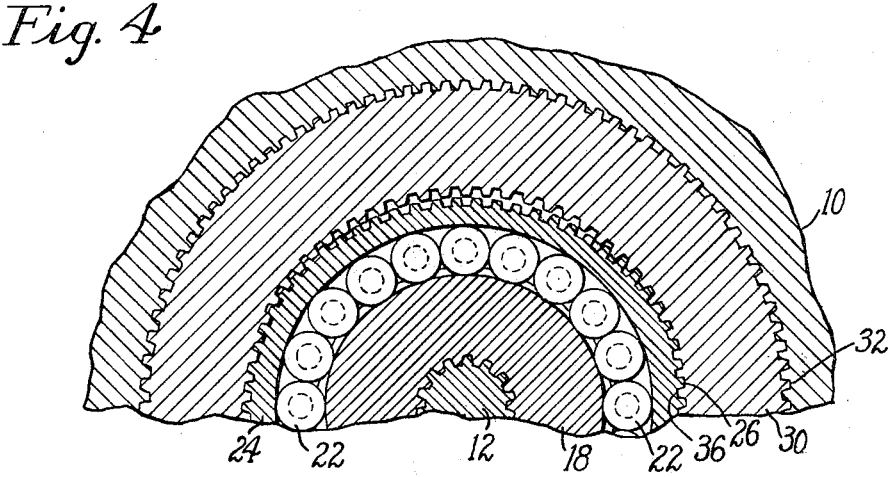

Referring to FIGS. 1–4 inclusive, a power hinge pin module according to one form of the invention will be described. In this version an angularly driven element 10 (FIGS. 1, 2 and 4) of the hinge unit is to be swung about an axis of an axially splined input shaft 12 which may be rotated by a motor M. The movable hinge element 10 is disposed between stationary hinge elements 14, 16 as will be explained. The shaft 12 is splined to a wave generator 18 (FIGS. 2–4) in this instance having an elliptoidal periphery (the major diameter being horizontal in FIGS. 3 and 4) and including a pair of lands 20, 20 (FIG. 2) for axially spacing wave generator roller bearings 22 which may be of the McGill or "dumbbell" type. It will accordingly be understood that these bearings 22 are caused by the rotating wave generator 18 to impart and rotate its elliptoidal shape in a tubular flexspline 24 formed with external splines 26.

For dynamically interconnecting the flexspline 24 to the stationary hinge elements 14, 16 there is provided a pair of fixed harmonic drive circular splines 28, 28; interconnecting the flexspline 24 to the movable hinge element 10 is a dynamic spline 30 axially disposed between the harmonic drive circular splines 28, 28. Externally the circular splines 28, 28 and 30 are formed with teeth 32 for meshing with corresponding internal teeth formed in the elements 10, 14 and 16. Internally the harmonic drive circular splines 28 are each formed with spline teeth 34 which are greater in number than the spline teeth 26 on the flexspline by two (or a multiple thereof), and the dynamic spline 30 is internally formed with spline teeth 36 of the same number as those on the flexspline 26. The deflection by the wave generator of the flexspline 24 is such that the pitch diameter at its major axis is equal to the pitch diameter at the circular spline teeth.

The illustrative module is held assembled by a pair of thrust washers 38, 38 and end caps 40, 40, the latter being respectively secured to the harmonic drive circular splines 28 as by recessed screws 42 (FIGS. 1 and 2), and the harmonic drive circular splines being retained in their axial position by snap rings 44, 44 seated in the respective stationary hinge elements 14, 16. Preferably a grease seal and retainer 46 (FIG. 2) is fitted in a circumferential groove formed by portions of the dynamic spline 30 and the adjacent circular splines 28.

In operation, as the major axis of the wave generator 18, and hence of the flexspline 24, is caused to rotate by the motor M, the harmonic drive circular splines 28 both serve as reaction or stationary anchoring members thereby causing the flexspline 24 itself to rotate at reduced speed and, oppositely to the direction of rotation of the wave generator, about the axis of the input shaft 12. It will be understood that actual speed reduction will be a function of the difference in the number of spline teeth 34 over the flexspline teeth 26. Rotation of the flexspline as thus effected is imparted to the output dynamic spline 30 at a 1:1 ratio which accordingly, through its teeth 32 angularly drives the element 10.

Of particular importance in reducing friction load and in alignment and supporting the hinge parts against side loading is the provision of an annular guideway formed in each of the circular splines 28 for receiving extending ring like bearing portions 48 (FIG. 2) integral with the dynamic spline 30. If preferred, the projecting bearing portions 48 may instead project from the circular splines 28 for reception and relative rotation in an annular guideway in the dynamic spline 30. Under the dynamic strain pattern induced in the circular splines by the rotation of the load carrying teeth as the input elliptoidal wave generator 18 is rotated, these bearing portions 48 are converted into sliding-rolling contact bearings. The torque load on the harmonic drive circular spline tends to strain it somewhat elliptoidal with its major axis approximating alignment with the major axis of the wave generator. For the dynamic spline the torque load tends to strain it somewhat elliptoidal but with its major axis at an angle of approximately 20° to that of the wave generator major axis. This angular difference of 20° between the elliptoidal axes produces a circumferentially advancing radial contact between the bearing surfaces which converts them from an otherwise plain journal bearing into a combined sliding-rolling contact bearing. Friction and lubrication problems are thereby markedly reduced, in some cases by as much as a factor of 20.

The remarkable decrease in friction attributable to the dynamic bearing wedges oppositely effected at each of the portions 48 is analogous to the easier steering of an automobile in motion as compared to when it is stationary. The velocity of the rolling points of contact between the two members 28, 30 is a function of the input rotation of the wave generator 18, while the relative sliding rotation between the two bearing members is dependent on the output rotation, and this output rotation equals the input rotation divided by the reduction ratio. Accordingly, it may be said that the ratio of rolling contact to sliding contact will essentially be equal to the reduction ratio. Thus rolling contact is present to a much higher degree than sliding contact at the bearing interfaces and will exceed by a factor of at least 10, thereby greatly facilitating smoother operation and reducing wear.

Figure 7:
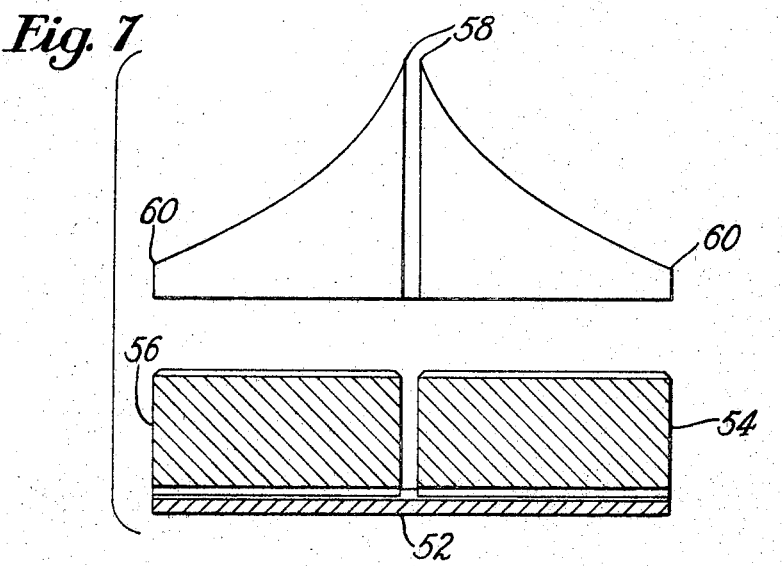
FIG. 7 is a sectional view of a flexspline cooperating in known manner with a harmonic drive circular spline and dynamic spline and indicating consequent load distribution.
Figure 8:
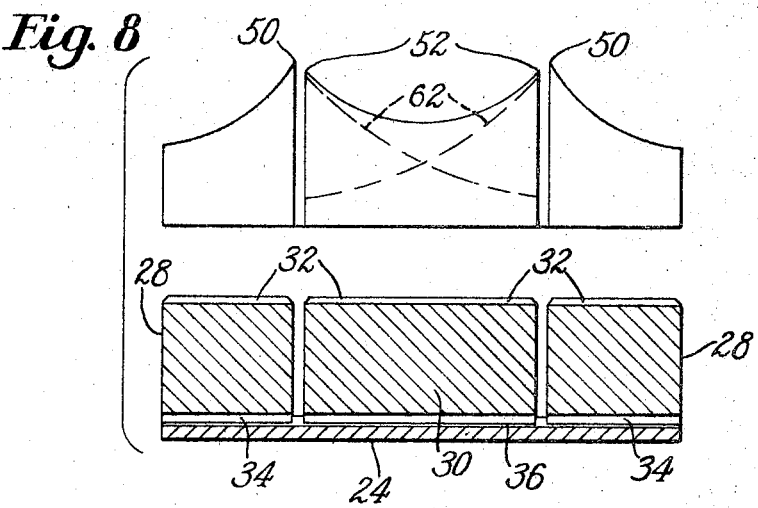
FIG. 8 is a view corresponding to FIG. 7 but schematically showing the improved distribution of tooth or spline loading attained by the present invention.

Attention is next invited to a comparison of FIGS. 7 and 8. The latter shows above the respective harmonic drive circular splines 28 a graph the ordinate of which is in units of spline tooth load, schematically indicating the increasing load sustained along the circular spline teeth 34 as they extend toward the output dynamic spline 30. While the maximum loads (at 50) exerted on the circular spline teeth 34 are greater than the minimum load on the dynamic spline 30 at its mid point, the curve between its axially spaced peak loads 52 is essentially flat and approximately of the same relative value as the load at 50. It is also important to note that the forces acting on the spline teeth, which are the loads being sustained by the flexspline 24, are in torsional balance. This is to be contrasted with the corresponding load concentrated condition prevailing in prior construction, such as disclosed in the cited Patent No. 2,959,065, and depicted in FIG. 7. A flexspline 52, corresponding in axial length to the flexspline 24 and cooperating with the dynamic spline 54 and a harmonic drive circular spline 56, incurs a concentrated load 58 at its mid region and much lower loads 60 at its axial extremities. Thus the old construction as shown in FIG. 7 is subject to greater wear resulting from concentrated imbalanced forces. The stress curve extending between the spaced points 50 in FIG. 8 is the hypothetical summation of its dotted line curves 62, 62 over the dynamic spline 30 each of which curves corresponds to the graph of FIG. 7 extending between the points 58 and 60. It is to be noted that the stress pattern in the flexspline 24 of FIG. 8 would not be significantly different if the output member had been a harmonic drive circular spline interposed axially between dynamic splines, though then the direction of the output would be the same as that of the input.

Figure 5:
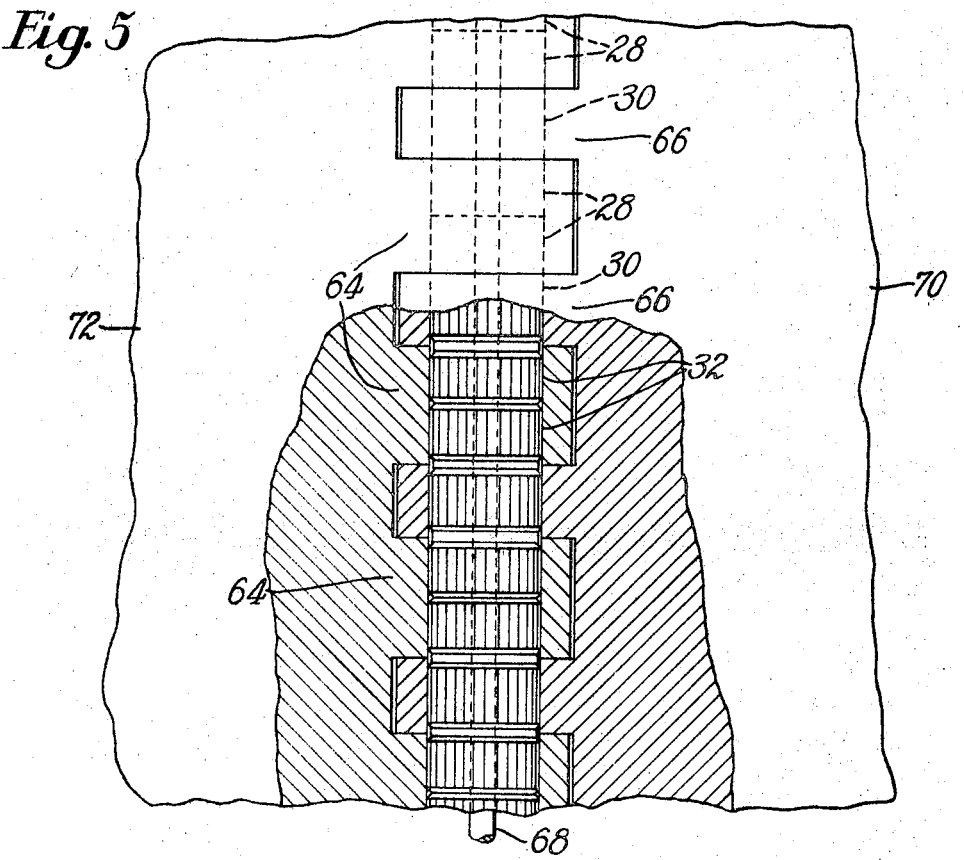
FIG. 5 is a side elevation partly in section of a stacked power hinge according to this invention.

FIG. 5 illustrates a power hinge in which a series of cartridge type modules such as explained with reference to FIGS. 1–4 is axially slid into stacked alternately stationary and rotatable hinge sections 64, 66 and over a splined input shaft 68. As many hinge units may be employed in axial stacking alignment as desired to control a member 70 which may, for instance, constitute a control surface angularly movable in relation to a fixed frame portion 72 of an aircraft. For convenience other like parts in FIG. 5 and the arrangement shown in FIGS. 1–4 bear like reference characters. In FIGURE 5 the series of modules is shown in units of three circular splines. It is to be understood that they also could be in units of 5, 7, 9 or any other arrangement wherein alternate splines are of the cooperative form-harmonic drive circular splines between dynamic splines, and, dynamic circular splines between harmonic drive circular splines.

Figure 6:
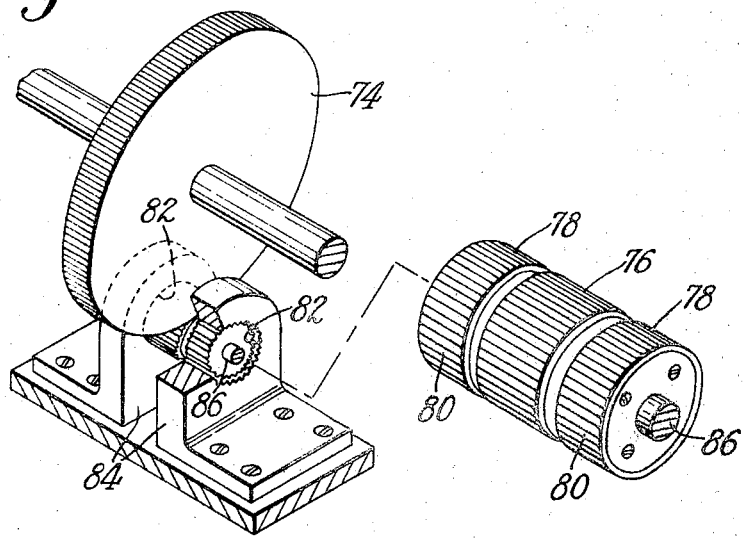
FIG. 6 is a perspective view of an alternative embodiment of the invention adapted to drive a bull gear, the gearing being shown in an enlarged detail.

Referring now to FIG. 6, there is shown an alternate arrangement of the invention wherein the output member, in the form of a bull gear 74, is continuously driven. In this instance it may be assumed, by way of distinction over the arrangement in FIGS. 1–4, that the gear 74 is in mesh with external teeth formed in a harmonic drive output circular spline 76 coaxial with, and disposed between a pair of dynamic splines 78, 78. The latter have their external splines 80 received in aligned and splined anchoring bores 82, 82 respectively formed in spaced brackets 84, 84, or other suitable stationary structure. Each of the dynamic splines is internally formed with spline teeth meshing at spaced localities with, and equal in number to, those formed externally on a flexspline (not shown but corresponding to the flexspline 24), whereas the number of internal splines formed in the output harmonic drive circular spline 76 exceeds such number by two or a multiple of two. As in the prior construction the flexspline has its shape rotated by a wave generator, not shown in FIG. 6, but which is rotatable by a coaxial input shaft 86.

Numerous changes of detail and rearrangement of parts may be employed without departing from the scope of this invention for better adapting it for particular applications. In the self-contained circular actuator employing an odd number of circular splines in excess of 1, balanced loads are produced on the flexspline. Moreover, the greater number of alternating fixed and rotating elements where multiple three-element hinge cartridges are used produces more uniform distribution of load throughout the parts of the assemblage, the latter resembling a piano type hinge in its compact outward appearance. If desired in lieu of a single flexspline axially spanning all elements of a composite actuator as herein shown, it is contemplated that several flexsplines, each spanning fixed and rotating circular splines may be employed, the choice probably being dependent on the relative costs of manufacture for a particular embodiment.

Throughout the description contained herein, a dynamic spline is used in conjunction with a harmonic drive. In this sense, one of these is used as a coupling and the total gear ratio is produced by the other. Where the ratios desired are in the order of 50:1 to 300:1 this construction is generally to be preferred. However, in those applications wherein ratios higher than 300:1 are desired it appears preferable to use the dual strain wave configuration described in United States Letters Patent No. 2,943,513 of July 5, 1960, issued on an application filed in my name. In this form both elements would be harmonic drive but they would have different ratios. Very high ratios can be obtained by this dual differential action. Diagrammatically this unit would be similar to the figures shown herein except that FIGURE 3 would now be correctly representative for both transverse sections III—III and IV—IV of FIG. 2. Accordingly, the term "dynamic circular spline" as used herein may be understood to include a dual differential harmonic drive and thus be applicable to rotary actuators of ratios 300:1 and higher.

Having thus described my invention, what I claim as new and desire to secure by Letters Patent of the United States is:

1. In a rotary actuator of the type comprising a pair of coaxial annular members relatively rotatable about their common axis and having at least one of the members continuously carrying a rotating strain wave, the provision of an annular bearing integral with one of said members and having an axially projecting portion in radial interfitting relation in the other whereby a high ratio of rolling to sliding contact is continuously incurred at circumferential bearing interfaces.

2. In a rotary actuator of the type comprising an axial series of concentric annular members relatively rotatable about their common axis, at least one of the members continuously carrying a rotating strain wave, the provision in an intermediate one of said members of annular bearing portions projecting axially into a circular groove in a radial face of an adjacent member, the bearing portions respectively having radial interfitting relation in the adjacent members and providing hydrodynamic wedges between said members whereby rolling contact greatly in excess of sliding contact is incurred at the circumferential bearing interfaces.

3. In a rotary reducer comprising axially disposed strain wave carrying members relatively rotatable about their common axis, the provision of axially extending deflectible journal bearings interfitting between the adjacent radial faces of the members, the axial bearing interfaces having circumferentially opposed wedge-like localities of continuous rolling-sliding contact whereat the ratio of rolling contact velocity to sliding contact velocity approximates the reduction ratio of the reducer.

4. An axially insertable rotary actuator cartridge for coupling to internally splined pivotal sections of a power hinge, said cartridge comprising, in coaxial relation to a central input shaft, a wave generator rotatably driven thereby, a flexspline for continuously carrying the strain wave thus circumferentially generated, and an axial series of three circular splines respectively having external splines of common diametral pitch and meshing with the internal splines of said pivotal hinge sections, respectively, the two outer of said three circular splines having internal splines for reaction meshing with the flexspline and the intermediate of said three circular splines having internal splines of the same number as said flexspline and matching therewith to provide an angular output drive to an intermediate one of said hinge sections, said intermediate circular spline having annular bearing portions projecting axially into the adjacent radial faces of said two outer circular splines for circumferential sliding-rolling contact at the bearing interfaces.

References Cited

UNITED STATES PATENTS

| | | | |
|---|---|---|---|
| 631,385 | 8/1899 | Rowley | 16—136 |
| 1,441,614 | 1/1923 | Wadsworth | 308—35 |
| 1,873,566 | 8/1932 | Ferris | 16—136 |
| 3,058,786 | 10/1962 | Banerian | 308—35 |
| 2,906,143 | 9/1959 | Musser | 74—640 |
| 2,929,266 | 3/1960 | Musser | 74—640 |
| 2,966,808 | 1/1961 | Grudin | 74—640 |

DONLEY J. STOCKING, *Primary Examiner.*

LEONARD H. GERIN, *Assistant Examiner.*

U.S. Cl. X.R.

16—136; 308—35